(12) United States Patent
Arnold et al.

(10) Patent No.: US 9,290,307 B2
(45) Date of Patent: Mar. 22, 2016

(54) ELECTRICALLY OPERATED FOOD PROCESSOR WITH A COOKING VESSEL, AND VESSEL WITH A LID

(75) Inventors: Hans-Peter Arnold, Kierspe (DE); Carsten Jacobs, Radevormwald (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 47 days.

(21) Appl. No.: 13/824,527

(22) PCT Filed: Sep. 6, 2011

(86) PCT No.: PCT/EP2011/065353
§ 371 (c)(1),
(2), (4) Date: Apr. 22, 2013

(87) PCT Pub. No.: WO2012/041660
PCT Pub. Date: Apr. 5, 2012

(65) Prior Publication Data
US 2013/0206771 A1 Aug. 15, 2013

(30) Foreign Application Priority Data

Sep. 30, 2010 (DE) .......................... 10 2010 037 892
Jun. 17, 2011 (DE) .......................... 10 2011 051 149

(51) Int. Cl.
*A47J 43/00* (2006.01)
*B65D 45/00* (2006.01)
(Continued)

(52) U.S. Cl.
CPC .............. *B65D 45/00* (2013.01); *A47J 27/004* (2013.01); *A47J 36/10* (2013.01); *A47J 43/046* (2013.01); *A47J 43/0727* (2013.01); *A47J 36/06* (2013.01)

(58) Field of Classification Search
CPC .............. A47J 43/0772; A47J 43/0777; A47J 27/0813; A47J 43/075; A47J 27/0811; A47J 36/10; Y10S 220/912
USPC ............... 220/324, 756, 318, 573.1; 292/194, 292/195, 198; 241/37.5, 282.1, 82.2, 241/199.12, 100, 92, 285.1; 99/492, 348, 99/510, 511, 513, 631, 645; 346/205, 314, 346/347, 197, 296
See application file for complete search history.

(56) References Cited

U.S. PATENT DOCUMENTS 3,080,996 A 3/1963 Graham
3,518,731 A * 7/1970 Ostrowsky et al. ............. 24/487
(Continued)

FOREIGN PATENT DOCUMENTS

DE 102 10 442 9/2003
EP 1 153 563 11/2001
WO WO 99/17646 4/1999

OTHER PUBLICATIONS

International Search Report of PCT/EP2011/065353, Oct. 25, 2011.

*Primary Examiner* — Mickey Yu
*Assistant Examiner* — Gideon Weinerth
(74) *Attorney, Agent, or Firm* — Collard & Roe, P.C.

(57) ABSTRACT

The invention relates, in the first instance, to an electrically operated food processor (1) with a cooking vessel (6) and a lid (10) for the cooking vessel (6), wherein it is possible to lock the lid (10) in the closed position in relation to the cooking vessel (6), wherein, furthermore, the cooking vessel (6) has a base and a wall (12) extending upwards from the base, wherein the cooking-vessel wall (12) merges into a radially projecting cooking-vessel periphery (13), wherein, furthermore, the lid (10) has a periphery (16) which, in the closed position, coincides with the cooking-vessel periphery (13). The invention also relates to a vessel (6) with a lid (10). In order further to improve a food processor and/or a vessel of the type in question, in particular in respect of the lid-locking means, it is proposed that the locking means is formed from a locking part (17) which is intended for engaging over the lid (10) and, by rotation about an axis (y), can be displaced from a release position into the locking position and vice versa, wherein the locking part (17) is of elongate design in the direction in which the axis (y) extends.

17 Claims, 10 Drawing Sheets

(51) Int. Cl.
*A47J 36/10* (2006.01)
*A47J 43/046* (2006.01)
*A47J 43/07* (2006.01)
*A47J 27/00* (2006.01)
*A47J 36/06* (2006.01)

(56) References Cited

U.S. PATENT DOCUMENTS

| | | | | |
|---|---|---|---|---|
| 4,108,054 A | * | 8/1978 | Klocker et al. | 99/348 |
| 4,111,372 A | * | 9/1978 | Hicks et al. | 241/37.5 |
| 4,269,519 A | * | 5/1981 | Birr | 366/206 |
| D261,719 S | * | 11/1981 | Gibiec | D7/355 |
| 4,373,677 A | * | 2/1983 | Kunihiro | 241/37.5 |
| 4,600,155 A | * | 7/1986 | Bos et al. | 241/37.5 |
| 4,863,278 A | * | 9/1989 | Otto | 366/143 |
| 5,071,077 A | * | 12/1991 | Arroubi et al. | 241/36 |
| 5,293,813 A | * | 3/1994 | Schultz | 99/337 |
| 5,317,959 A | * | 6/1994 | Beluzzi | 99/337 |
| 5,427,014 A | * | 6/1995 | von der Becke et al. | 99/337 |
| 6,340,124 B1 | | 1/2002 | Charles et al. | |
| 6,435,708 B1 | * | 8/2002 | Huang | 366/347 |
| 6,450,361 B1 | * | 9/2002 | Mendelson et al. | 220/573.1 |
| 6,786,141 B2 | * | 9/2004 | Tompa et al. | 99/492 |
| 6,824,004 B1 | * | 11/2004 | Wooderson | 220/318 |
| 7,574,773 B2 | * | 8/2009 | Dahl et al. | 16/258 |
| 8,863,360 B2 | * | 10/2014 | Mukherjee et al. | 16/353 |
| 2003/0075627 A1 | * | 4/2003 | Pavlovic | A47J 43/0772 241/37.5 |
| 2004/0200851 A1 | | 10/2004 | Wooderson | |
| 2014/0001296 A1 | * | 1/2014 | Gen et al. | 241/100 |
| 2015/0208868 A1 | * | 7/2015 | Caldewey | A47J 36/10 366/243 |

* cited by examiner

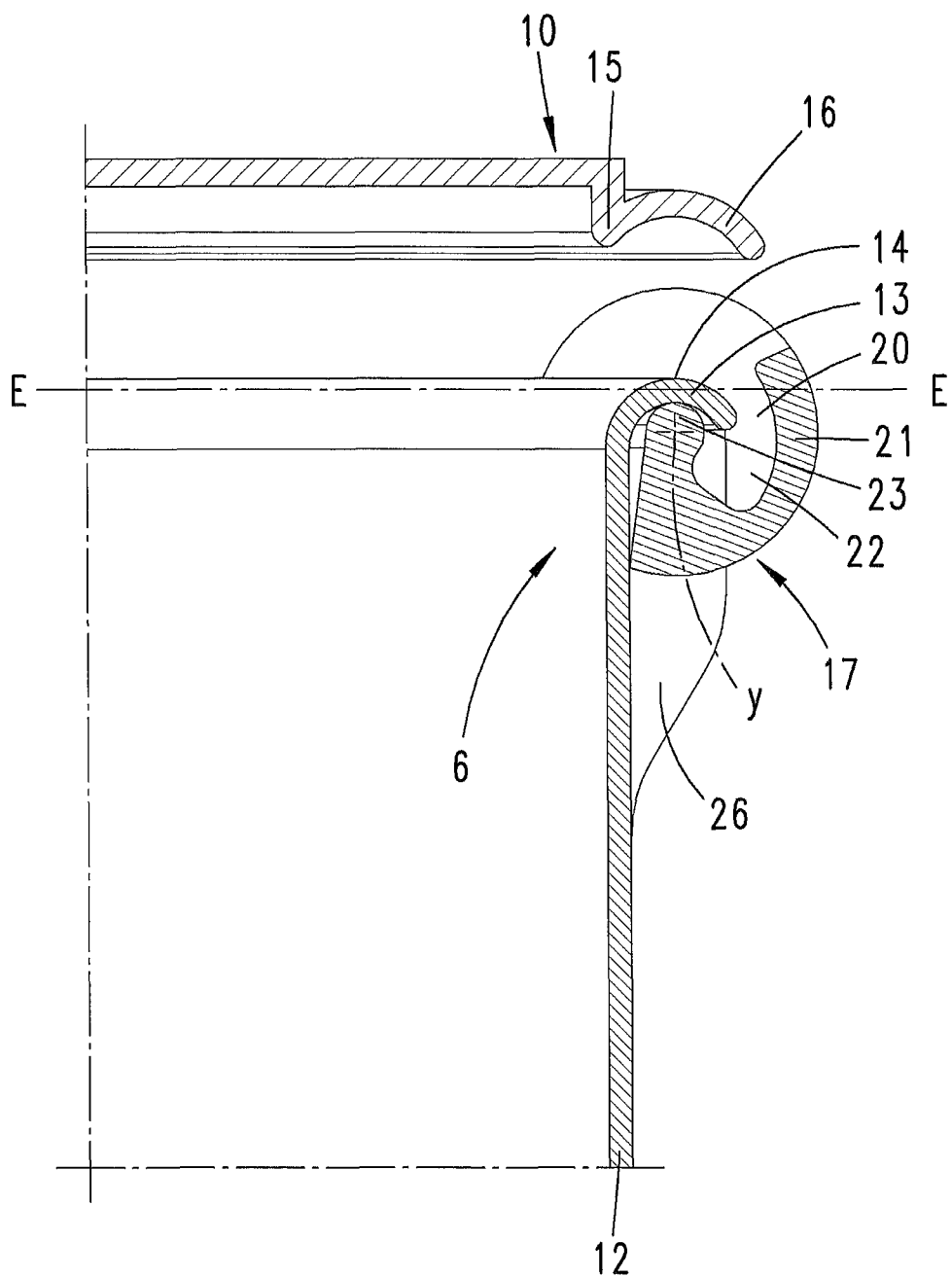

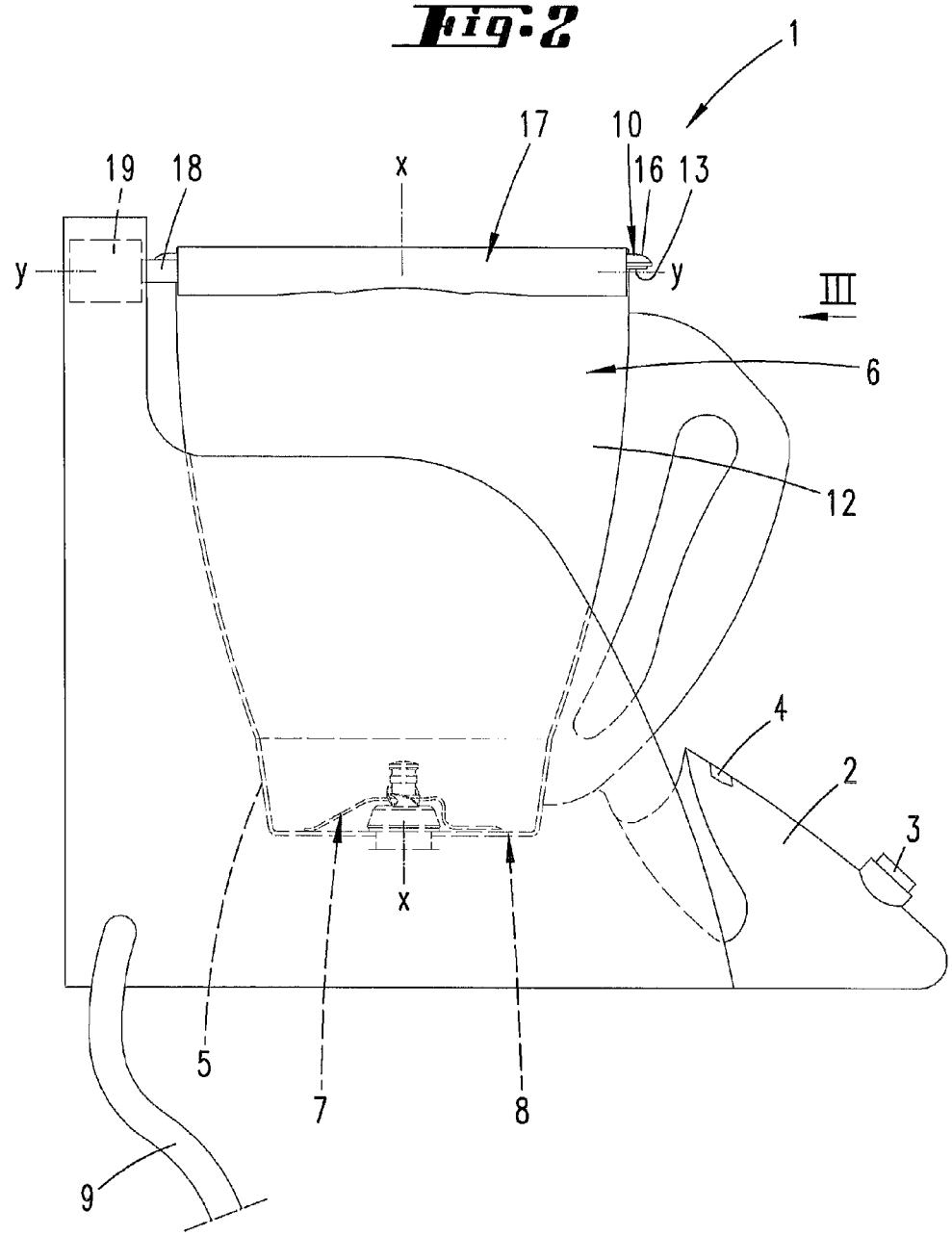

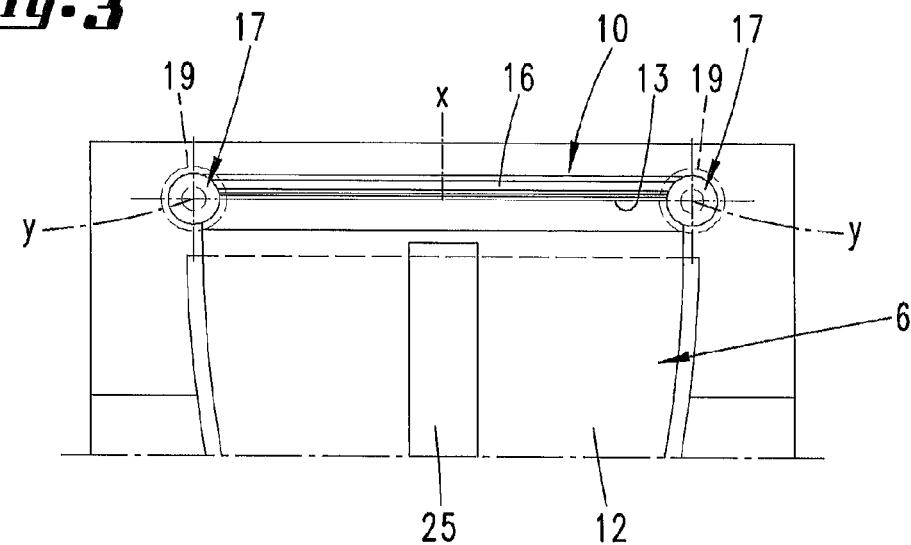
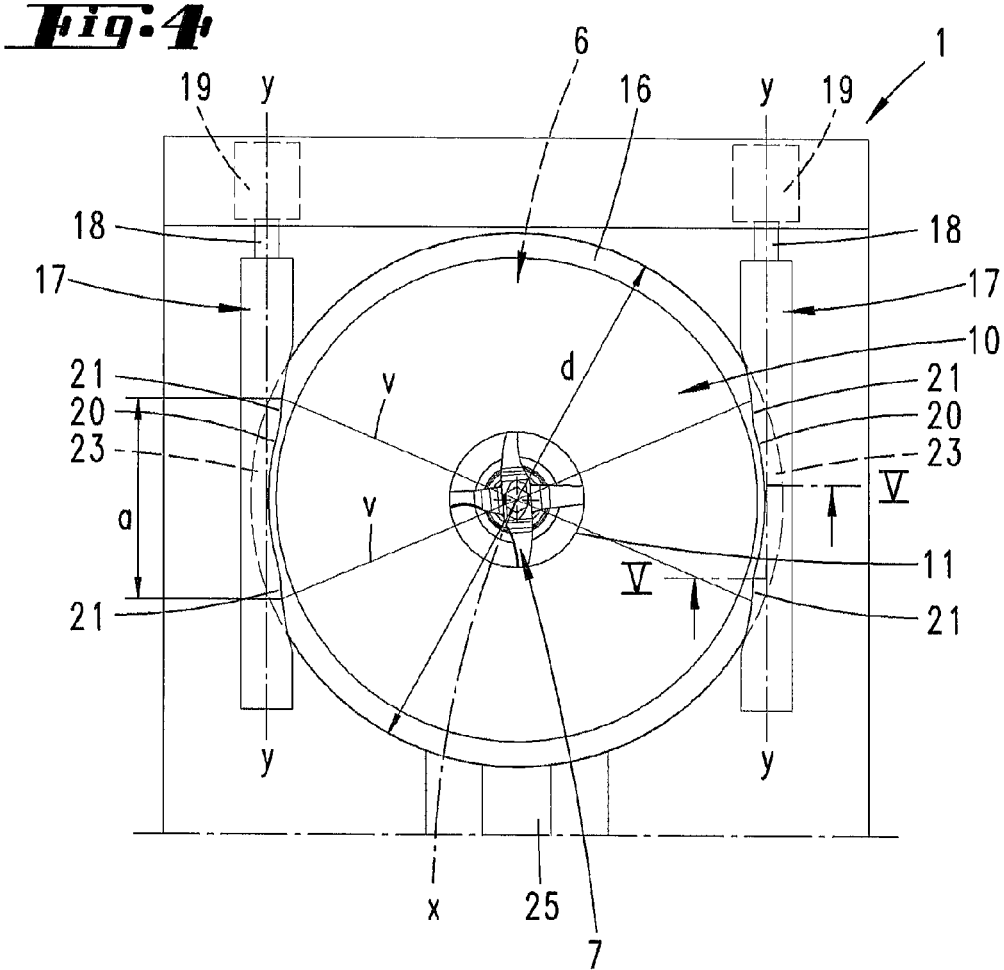

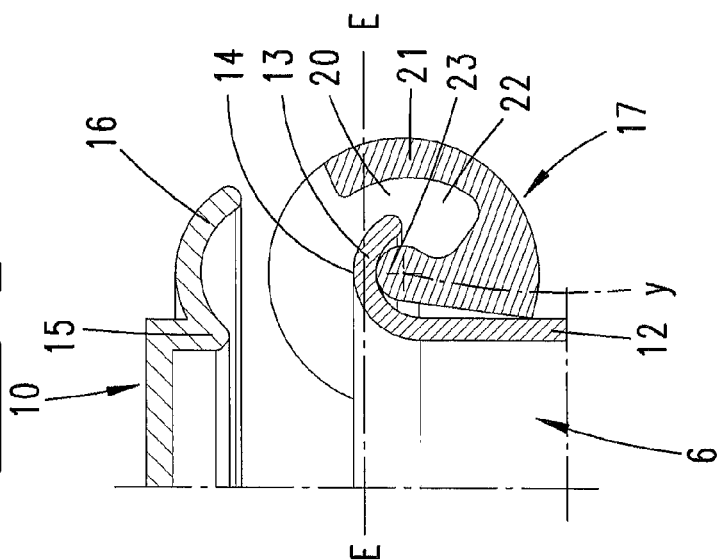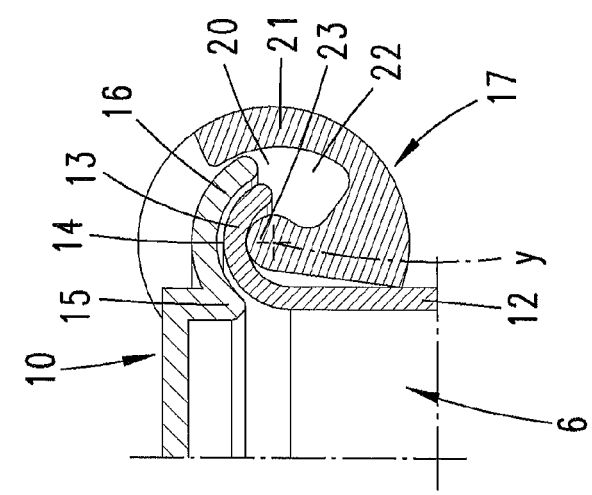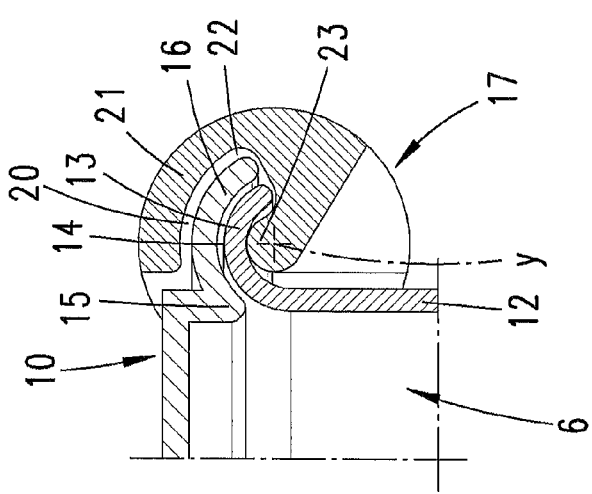

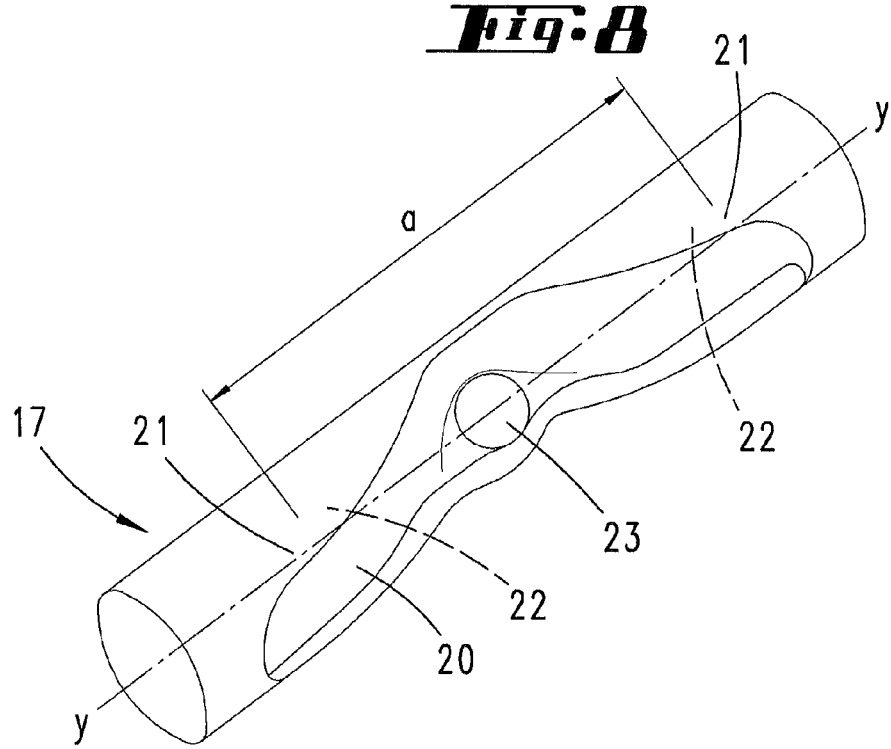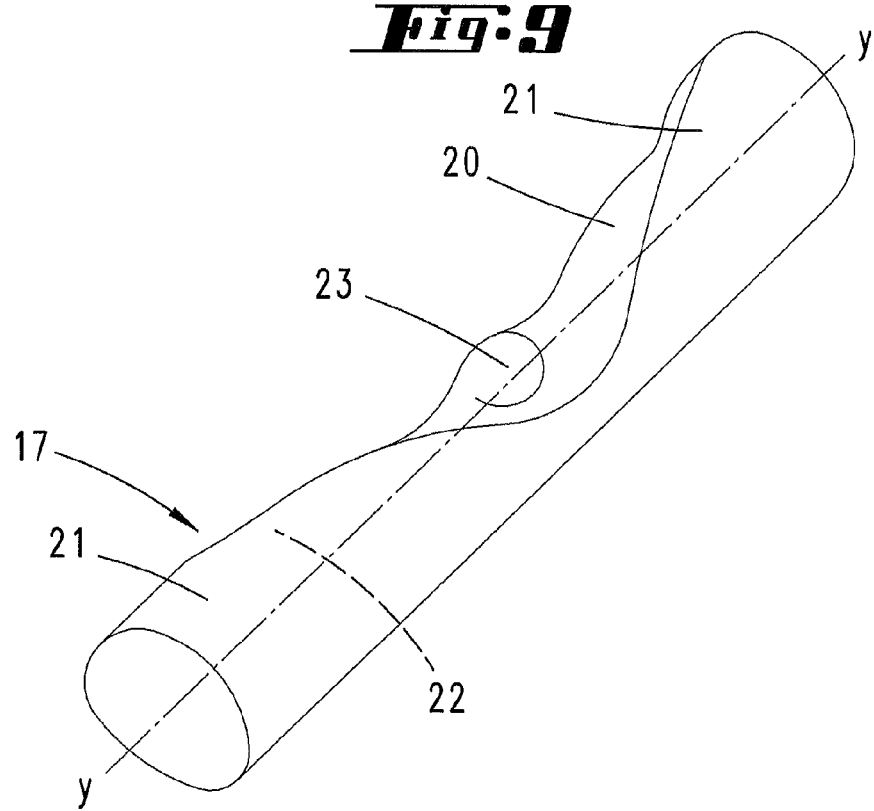

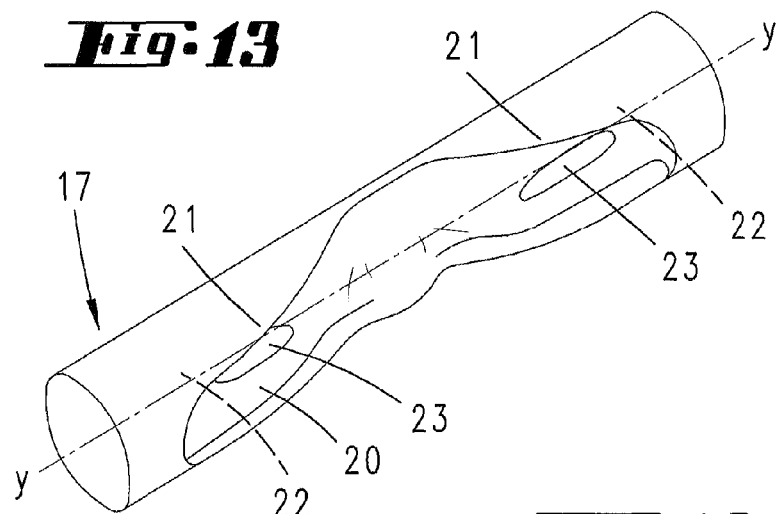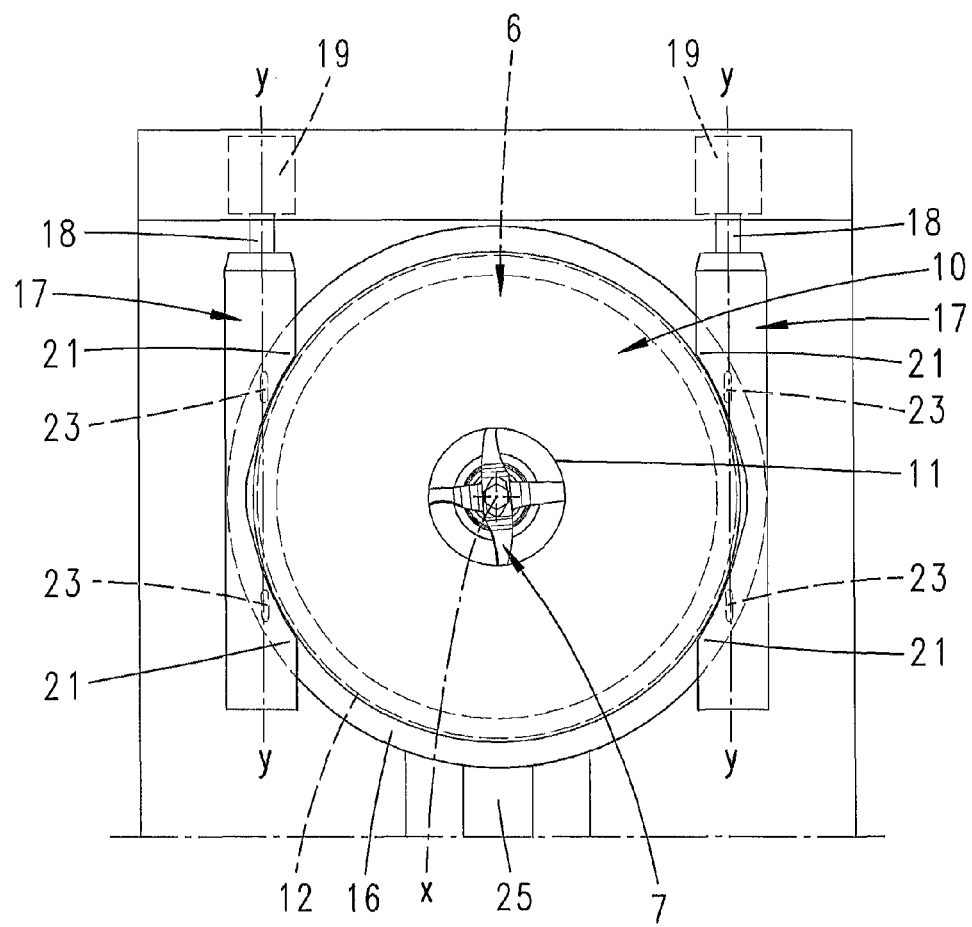

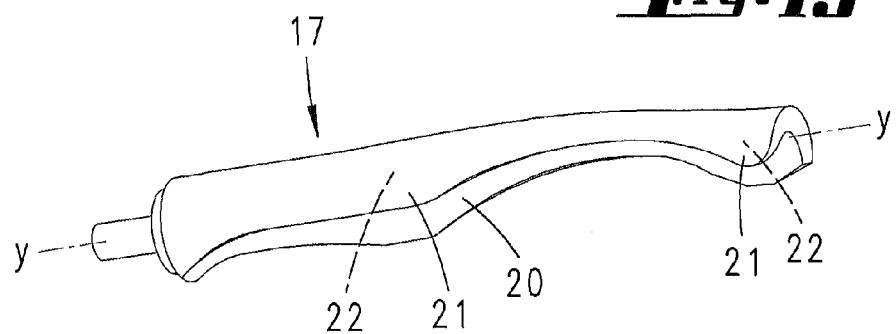
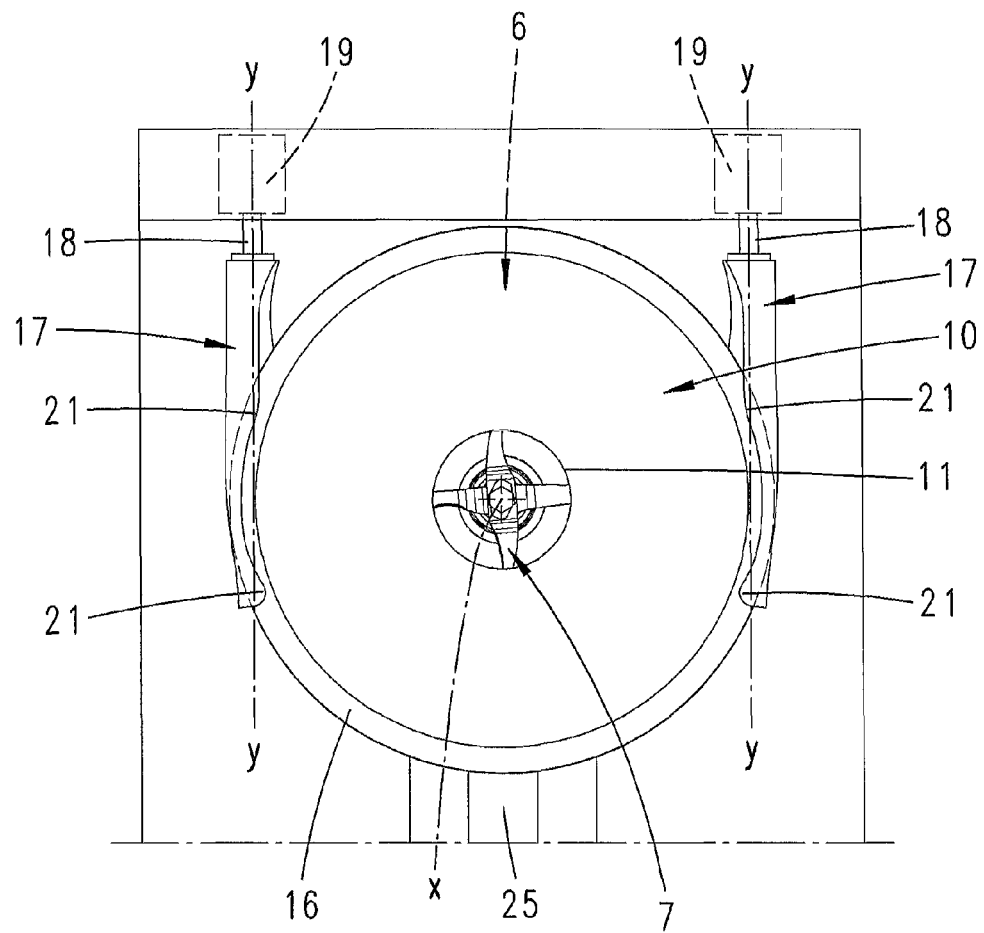

ELECTRICALLY OPERATED FOOD PROCESSOR WITH A COOKING VESSEL, AND VESSEL WITH A LID

CROSS REFERENCE TO RELATED APPLICATIONS

This application is the National Stage of PCT/EP2011/065353 filed on Sep. 6, 2011, which claims priority under 35 U.S.C. §119 of German Application No. 10 2010 037 892.5 filed on Sep. 30, 2010 and German Application No. 10 2011 051 149.0 filed on Jun. 17, 2011, the disclosures of which are incorporated by reference. The international application under PCT article 21(2) was not published in English.

BACKGROUND OF THE INVENTION

1. Field of the Invention

The invention relates, in first instance, to a vessel having a lid, according to the features of the invention.

The invention also relates to an electrically operated kitchen appliance according to the features of the invention.

2. Description of the Related Art

Kitchen appliances and vessels having a lid, of the type here in question are known. They are used in particular in the household sector for cooking or preparing food, for which purpose the cooking vessel which is associatable with the kitchen appliance is designed to hold foods, for example foodstuffs for cooking or fluids. In particular for heatable cooking vessels for kitchen appliances, high pressures are sometimes reached inside the vessel, in particular in the course of the cooking process. If in addition a stirring unit is associated with the cooking vessel, in particular in the base region, during the stirring operation a column of liquid may possibly act on the underside of the lid which is mounted on the cooking vessel. The lid must be suitably locked to the cooking vessel, this lock being able to absorb the pressures which may result in the cooking vessel or forces which may act on the lid. In this regard, approaches are known in which the lid may be fixed to the cooking vessel via a bayonet-like twist lock, for example.

In addition, kitchen appliances of the type in question are known under the name Vorwerk Thermomix. In this regard, reference is made to DE 10210442 A1, for example. The contents of the cited patent application are hereby included in full in the disclosure of the present invention, including for the purpose of incorporating features of the cited patent application in claims of the present invention.

From U.S. Pat. No. 6,340,124 B1, there is known a vessel in which the cooking vessel wall ends without a radially outward protrusion. As a locking part, there is provided a rotary part having an over-engaging portion that comes into contact on the upper side of the edge of the lid in the locking state. Comparable prior art is known also from WO 99/17676 A and EP-A-1153563. From US-A-2004/0200851, there is known a cooking pot with a lid, the locking of the lid being achievable by means of a blocking part that engages on the lid from above.

SUMMARY OF THE INVENTION

Proceeding from the above-mentioned prior art, it is an object of the invention to configure a vessel or a kitchen appliance of the kind in question in an advantageous manner as regard locking of the lid.

This object is achieved initially by the subject matter of the present invention, this being based on the locking part, which is formed with an overall wave-like design, being provided with a cavity that extends over the axial length, wherein, which with respect to a vertical cross-section, a circular arc-like over-engaging portion is provided and the cavity portion covered by the over-engaging portion is adapted, with regard to its radial extent and also with regard to its extent in the peripheral direction, for accommodating in a positive-fit manner the vessel rim as well as the lid edge of the lid mounted on the vessel.

The object is also met by the subject matter of the invention, which relates to a kitchen appliance having the features of the invention.

The locking part is rotatably or pivotably mounted, in particular for twisting or swiveling it from a release position into the locking position and vice versa, this more preferably by hand, in particular by the user, also alternatively or in combination with same, as the result of an electric motor drive of the locking part.

The locking part, in particular a portion thereof which brings about the locking, is preferably directly associated with the overlap region of the lid edge and the vessel rim. The locking part which has been brought into the locking position engages over the lid edge, so that in the locking position, a portion of the locking part which brings about the locking vertically overlies the lid edge and also the vessel rim.

The locking part is elongated in the direction of extent of the axis in the sense of a shaft or a shaft body having a longitudinal extent which preferably corresponds to 2 to 10 times, more preferably 3 to 5 times, the dimension, viewed transversely thereto, in the locking region. In this regard, the length of the locking part is more preferably selected in such a way that, disregarding any drive means or the like which lengthens the longitudinal extent of the locking part, it is equal to or less than an average transverse dimension of the cooking vessel in the region of the upwardly facing vessel opening which is to be covered by the lid; for a cooking vessel which is preferably circular in plan view, this dimension is the diameter. The lid is thus secured against being lifted vertically upward, so that a given pressure increase within the vessel and/or an action of a rising column of liquid on the lid from below do(es) not result in lifting off of the lid, causing a loss of the covering seat on the vessel. The lid, in particular the lid edge, or alternatively, the vessel rim which interacts with the lid or a vessel portion which interacts with the lid, is more preferably provided with a seal, for in particular liquid-tight interaction of the lid and the vessel in the interaction region. Due to the selected arrangement and configuration of the locking part, the locking part may be actuated by low forces. Mounting of the lid independently of position is made possible with a preferred circular disk-shaped configuration of the lid, and conforming thereto, a circular configuration of the vessel opening to be covered.

It is preferred that the extent of the geometric axis is adapted to a plane that is determined by a lid edge. The locking part preferably extends, at least partially, in a plane circumferentially determined by the lid edge and/or the vessel rim, which in a preferred embodiment is oriented transversely with respect to a vertically aligned vessel axis. The geometric axis more preferably extends horizontally or at an angle to the horizontal, more preferably defining an acute angle of 1° to 15° or up to 30°, more preferably extending parallel to the plane with a tolerance of preferably ±0.5° to 30°.

It is also preferably provided that the geometric axis is situated outside the vessel wall. This geometric axis extends in particular at a radial distance from an outer surface of the vessel wall, more preferably at a radial distance outside the vessel wall portion associated with the geometric axis with respect to height, so that in one possible configuration, the geometric axis is in fact tangential to or also passes through a region of the vessel wall, preferably at a vertical distance above and below same, in a vertical projection with respect to a use position of the vessel. It is also preferably provided that the geometric axis passes through the vessel wall in the region of the vessel wall portion associated with the geometric axis with respect to height, more preferably in such a way that the geometric axis, viewed over its extent, extends with a partial portion through the vessel interior, at least one further partial portion of the geometric axis in a corresponding elongation more preferably extending outside the vessel wall while passing through same.

In another preferred embodiment, it is provided that a positive fit is achieved in the locking position, at least a partial portion of the locking part engaging over the lid, in particular the lid edge, in a positive-fit manner. In the basic position of the lid, which is not acted on by internal pressure or the like during operation of the kitchen appliance, the portion of the locking part which interacts with the lid edge preferably does not act in a positive-fit manner, although in an alternative embodiment, also optionally in dependence on the configuration of the seal which acts between the lid and the vessel wall or the vessel rim, this type of force fit may be achieved in addition to the positive fit. To provide the positive fit, in particular the portion of the locking part that is used for the locking is adapted to the shape of the lid edge to be engaged over, at least in portions, with respect to a vertical cross-section.

It is also preferably provided that the locking part is rotatably drivable from one or both end portions from the release position into the locking position, and vice versa. In direct engagement with the locking part, or optionally also in engagement with a portion which extends the locking part, for example a drive shaft connected to the locking part in a positive-fit manner, the locking part it is grippable by the hand of the user for displacement of the locking part, or alternatively or in combination therewith is drivable for this purpose by means of an associated electric motor which more preferably is suitably provided in the kitchen appliance. In the case of the rotary drive via an electric motor on the kitchen appliance, the locking part is preferably moved into the locking position or out of this position into the release position by pushing a button or the like, more preferably automatically on switching on the kitchen appliance or starting a heater of the kitchen appliance and/or a stirring unit of the kitchen appliance. If lid detection is also provided, which is preferred, starting the kitchen appliance (heater and/or stirring unit) is possible only when the lid is properly mounted and locked. In addition, the geometric axis preferably extends beneath the vessel rim, more preferably at a vertical distance from an opening plane of the vessel, this distance preferably corresponding to one-twentieth to one-fifth of the largest diameter in the region of the vessel rim.

The locking part has an over-engaging portion which in the locking position is guided over the lid edge to secure same. In this regard, in the locked state at least two over-engaging portions at a distance from one another in the peripheral direction of the lid edge preferably are provided on the locking part. Thus, in the locking position, a securing overlap of the lid or the lid edge at two points separated at a distance from one another in the peripheral direction is achieved by means of a locking part. Each over-engaging portion preferably overlaps the lid edge with a vertical play in the one-tenth millimeter range, more preferably with a vertical play of 0.1 to 1 mm, in addition the play being selected in such a way that vertical movability of the lid is permitted during operation of the kitchen appliance, but without impairing the seal-tightness that is ensured by the preferred radial seal. Due to the vertical play preferably provided between the over-engaging portion and the lid edge, the over-engaging portion engages freely over the lid edge, without frictional or positive-fit interaction, in the course of the locking displacement of the locking part and in the locking position.

In the locked state, the outermost locking areas of the locking part are more preferably separated from one another by a distance that is 1/10 to 1/2 of the lid diameter, more preferably 1/8 to 1/3 of the lid diameter, more preferably 1/4 of the lid diameter, or of the average extent of the lid viewed transversely with respect to the vertical axis of the cooking vessel.

It is also preferred that the locking part engages over the lid edge in a circular manner in cross-section over a range of 30° to 90° and/or approaches this range, in particular an over-engaging portion more preferably being aligned concentrically with respect to the rotational axis of the locking part.

In a vertical section, more preferably in the vessel and lid association position, the vessel rim and/or the lid edge also more preferably extend at least approximately concentrically with respect to the rotational axis of the locking part; in particular in the case of a corresponding vertical cross-sectional configuration of the lid edge due to the preferably concentric alignment of the lid edge and the over-engaging portion, the latter more preferably overlies the lid edge over the entire displacement path, with a vertical distance of a few tenths of a millimeter.

The locking position as well as the release position of the locking part are more preferably stop-limited, in particular as a result of structural features on the locking part and/or on the partners, such as the cooking vessel and/or lid, which interact with the locking part. The rotational limitation of the locking part, in particular for an electric motor drive due to the configuration of the electric motor, may also be provided as a servomotor which permits only rotationally limited displacement of the locking part. If the stop is provided on the lid in the locking position, the lid at the same time may be used as a detection means. If an in particular electric motor allows displacement of the locking part beyond the stop position, the stop, and thus the lid, are absent, and the excessively large locking path is detected by a suitable sensor system.

In one embodiment, two locking parts are oppositely situated with respect to a center axis of the cooking vessel, thus achieving an overall four-point locking of the lid on the cooking vessel. In this regard, the axes of the two locking parts preferably extend parallel to one another.

Alternatively, a stationary over-engaging element is formed opposite from the locking part, in particular opposite from one locking part. This element is provided by the vessel rim, or more preferably by the kitchen appliance, as the result of which at least an overall three-point locking of the lid is accordingly achieved when only one locking part is provided. As a further alternative, the stationary over-engaging element may also be formed in the region of a handle, in particular a substantially vertically extending handle that is connected to the cooking vessel.

As a further alternative, two oppositely situated locking parts are provided, the axes of the locking parts defining an acute angle, in particular an acute angle of 30° to 60°, more preferably approximately 45°, with respect to a top view of the cooking vessel or the lid. At least four portions which overlap the lid edge are thus provided which are distributed over the periphery, and in another preferred embodiment a stationary over-engaging element is provided opposite from a point of intersection of the two locking axes with respect to a top view, correspondingly resulting in a preferred five-point locking of the lid.

It is further preferred that the cooking vessel is held in the vertical direction by the locking part in order to be able to thus compensate in a targeted manner on the underside of the vessel for necessary length tolerances between the cooking vessel and the housing of the kitchen appliance accommodating the cooking vessel. For this purpose, it is provided that the locking part has one or more contact areas for the vessel rim, so that in a preferred embodiment the cooking vessel more preferably hangs in a suspended manner, so to speak, on the locking part, more preferably on the locking parts, this more preferably in the case of a suitable circumferential mount for the cooking vessel, in particular in the lower region facing the vessel base. The contact area preferably has a spherical head-like or crowned shape, and in particular with respect to a vertical cross-section is provided for supporting the correspondingly shape-adapted vessel rim in a positive-fit manner. This contact area is preferably provided centrally, with respect to the longitudinal extent of the locking part, between the outermost locking areas, so that after the locking part is displaced into the locking position, the over-engaging portions, viewed in the peripheral direction of the lid, correspondingly uniformly engage over the lid edge on both sides of the contact area, at a distance therefrom.

In another embodiment, the locking part preferably has two contact areas for the vessel rim which are offset over the periphery of the vessel rim, more preferably in conjunction with a geometric axis which passes through the vessel wall. These two preferred contact areas are more preferably formed, viewed in the direction of extent of the axis, in front of and behind the locations where the geometric axis passes through the vessel wall, more preferably at specific points, and also, when there is only one contact area, in a line. In particular cleaning of a locking part formed in this way is thus further improved. In addition, due to the preferred arrangement of two contact areas, in particular when two locking parts are provided, at least an overall four-point contact is achieved, so that in a preferred embodiment sufficient stability is attained.

The locking part, more preferably in the lid release position, is used for accommodating and holding the lid in an at least approximately vertical orientation of the lid, so that the lid may be placed on the circumferential vessel rim on the lid edge, so that, for example, further recipe ingredients may be added through the vessel opening which is now open. Any soiling on the lid interior is able to run back into the cooking vessel via the vessel rim without soiling the surroundings. The lid is supported on a portion of the circumferential lid edge rim, in particular on the contact area of the locking part, radially inward support being provided by the vessel rim, and radially outward support being provided by a portion of the locking part, more preferably by the over-engaging portion which is brought into the unlocked position.

With regard to all stated value ranges, all values in between, in particular in 1-mm and/or 1-fold and/or 1-degree increments, with regard to one or multiple delimitations of the stated range limits in the indicated increments, for example, from below and/or from above, and also for illustrating single values within the stated ranges, are hereby included in the disclosure.

BRIEF DESCRIPTION OF THE DRAWINGS

The invention is explained below with reference to the appended drawings, which, however, merely represent exemplary embodiments. A part which is explained in relation to only one of the exemplary embodiments, and which in a further exemplary embodiment is not (exactly) replaced by a different part due to the feature emphasized there, is therefore described, for this further exemplary embodiment as well, as a part that is possibly present in any case. The drawings show the following:

FIG. 1 shows in a schematic sectional illustration the region of cooperation between a vessel having a lid and a locking part situated on the vessel;

FIG. 2 shows a kitchen appliance of the type in question in a side view, having a cooking vessel closed by a lid;

FIG. 3 shows the view according to arrow III in a partial illustration;

FIG. 4 shows the top view of FIG. 2;

FIG. 5 shows the schematically illustrated section according to the line V-V in FIG. 4 for a locked lid position;

FIG. 6 shows an illustration corresponding to FIG. 5 for the unlocked lid position;

FIG. 7 shows an illustration corresponding to FIG. 6 with the lid removed;

FIG. 8 shows a locking part for securing the lid, in a perspective illustration;

FIG. 9 shows another perspective illustration of the locking part;

FIG. 13 shows an illustration corresponding to FIG. 8 for a second embodiment of a locking part;

FIG. 14 shows an illustration corresponding to FIG. 4 for the second embodiment of the locking part according to FIG. 13;

FIG. 15 shows the locking part in a perspective illustration for another embodiment; and FIG. 16 shows an illustration corresponding to FIG. 4 for the embodiment according to FIG. 15.

DETAILED DESCRIPTION OF PREFERRED EMBODIMENTS

Figure 10:
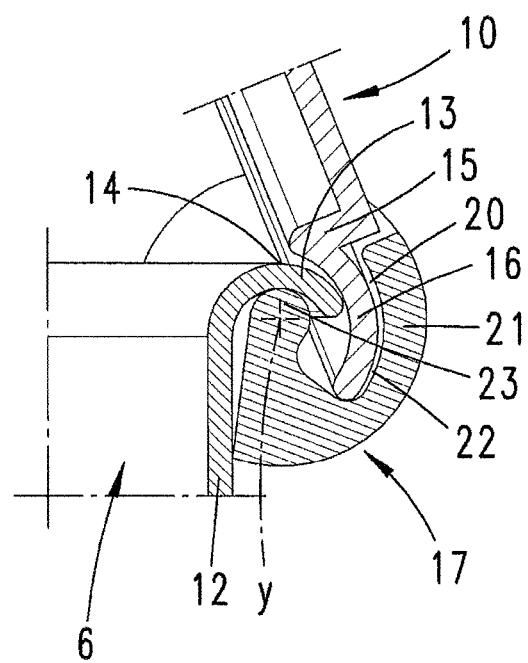
FIG. 10 shows another schematic sectional illustration corresponding to FIG. 5, for the position according to FIG. 6, in an arrangement of the lid in a mounted position which uncovers the vessel opening.

With reference initially to FIG. 1, the region of cooperation of a vessel rim 13 of a vessel 6 which may preferably be placed in a free-standing position is illustrated and described in a schematic vertical sectional illustration, a lid 10 being associatable with the vessel rim for closing the vessel 6. The lid has a lid edge 16 which may be brought to overlie the vessel rim 13.

A mounting 26 is secured on the outer wall side of the vessel wall 12, a locking part 17 being pivotably mounted on the mounting 26, as described in greater detail below.

The configuration and principle of operation, by way of example, of the locking part 17 are described in greater detail below with reference to FIGS. 2 to 12, an electrically operated kitchen appliance 1 being illustrated and described, initially with reference to FIG. 2.

The kitchen appliance has, in first instance, a control panel 2 preferably having a plurality of controllers and/or buttons 3, and preferably a display 4 for displaying the parameters to be set in particular via the controllers and/or buttons 3.

The kitchen appliance 1 also has a vessel holder 5.

A vessel 6 in the form of a cooking vessel is accommodatable and mountable in the vessel holder, in particular in the base region of the cooking vessel, preferably in a positive-fit manner.

The vessel 6 preferably has a substantially rotationally symmetrical shape, with a central vertical axis x.

In the base region, the vessel 6 preferably has a stirring unit 7. In the association position of the vessel 6 in the vessel holder 5, the stirring unit is coupled in a positive-fit manner to a stirring unit drive provided in the kitchen appliance 1.

Electrical power for the stirring unit drive, and for a heater 8 which more preferably is provided at the container base, as well as for the electrical control of the overall kitchen appliance 1, is supplied via a power cord 9.

In addition, the vessel 6 is closed by a lid 10, in particular during operation of the stirring unit 7 and/or the heater 8. The lid preferably has a central filling opening 11 through which the vertical axis x of the vessel 6 passes, more preferably in the case of a lid 10 which in the plan view has a substantially circular disk shape overall.

The vessel 6 has a vessel wall 12 which extends vertically upward from the base region, and which at the vessel opening merges into a radially outwardly protruding vessel rim 13. The vessel rim is formed in the shape of a circular line section with respect to a vertical cross-section (see FIG. 6), more preferably in the shape of a semicircular line, having a vertically upwardly directed curved surface 14.

On the underside, i.e., in the association position facing the vessel interior, the lid 10 is provided with a circumferential collar 15 which extends substantially coaxially with respect to the vertical axis x. At the base of the collar 15, a radially outwardly extending lid edge 16 is suitably formed along the collar edge rim that faces the vessel interior in the association position. The lid edge extends, with respect to a vertical section according to FIG. 6, in conformity with the vessel rim 13 in the shape of a circular line section, more preferably with a concentric curvature with respect to the vessel rim 13 in the association position of the lid 10. In the association position, the lid 10 is supported via its lid edge 16 on the vessel rim 13 (see FIG. 5).

Although not illustrated, a seal, in particular for the fluid-tight arrangement of the lid 10 on the vessel 6, is provided on the lid 10 or in the region of the vessel rim 13. Such a seal is usually made of a soft plastics material, for example a thermoplastic elastomer.

In particular during operation of the kitchen appliance, more especially during operation of the stirring unit and/or heater, the lid 10 must be locked on the vessel 6, since high forces, for example due to a comminution process by use of the stirring unit 7 and/or due to fluid dynamics in the vessel 6, may develop during operation of the kitchen appliance 1. For this purpose, the kitchen appliance 1 has at least one locking part 17 which locks the lid 10 against the vessel 6. This locking part 17 preferably has an elongated, wave-like shape having a central axis aligned in the longitudinal extent which at the same represents a rotational axis y of the locking part 17. The locking part further extends parallel to a plane E determined by the lid edge 16 and by the vessel rim 13.

In addition, the arrangement of the rotational axis y is selected in such a way that it extends radially outside the vessel rim 13, also vertically overlapping the vessel rim 13 beneath same. In this regard, it is further preferred that the rotational axis y, with respect to a vertical section according to FIG. 6, intersects the midpoint of the vessel rim 13 that has the shape of a circular line section.

As a result of the above-described arrangement and orientation of the rotational axis y, the locking part 17, which has an overall elongated cylindrical shape, is situated in such a way that, with respect to a top view (see FIG. 4), it intersects the cooking vessel rim 13, and in the association position intersects the lid edge 16, in a secant-like manner, the axial length of the locking part 17 being selected in the illustrated exemplary embodiment in such a way that both end portions of the locking part, with respect to a top view, freely project beyond the secant-like, partially enclosed edge region.

One end of the locking part 17 is connected via a stub shaft 18 to an electric motor 19 situated in the kitchen appliance 1. As illustrated, the arrangement of the electric motor 19 may be selected in such a way that its rotational axis coincides with the rotational axis y of the locking part 17. Alternative approaches in this regard provide an arrangement of such an electric motor 19 in the base portion of the kitchen appliance 1, for example, in this case a transmission into the plane of the rotational axis y being provided, for example by means of a belt drive or the like.

The locking part 17 is fixed via the stub shaft 18 to the kitchen appliance 1 so as to be rotatable about the axis y, in particular with an overall freely protruding arrangement of the locking part.

The locking part 17, having an overall wave-like design, is also provided with a cavity 20, which in the illustrated exemplary embodiment preferably extends over approximately 60 to 70% of the axial length of the locking part 17. The locking part is configured in such a way that with respect to a vertical section, i.e., with respect to a section viewed perpendicular to the rotational axis y, a circular arc-like over-engaging portion 21 results which in each case is associated with the end region of the cavity 20, viewed in the axial direction. This over-engaging portion preferably extends concentrically with respect to the rotational axis y, the cavity portion 22 covered by the over-engaging portion 21 being adapted, with regard to its radial extent and also with regard to its extent in the peripheral direction, for accommodating in a positive-fit manner the vessel rim 13 as well as the lid edge 16 of the lid 10 mounted on the vessel 6. The over-engaging portion 21, which freely protrudes with respect to a vertical section, preferably extends in a circular arc-like manner, and in the illustrated exemplary embodiment extends over a range of approximately 80° to 85°.

The locking areas in the region of the over-engaging portions 21 which result from the above-described configuration, viewed in the direction of extent of the rotational axis y, are separated from one another by a distance a, which, in the illustrated exemplary embodiment, corresponds to approximately one-third of the lid diameter d.

A contact area 23 is formed in the middle between the over-engaging portions 21, also viewed in the direction of extent of the rotational axis y. The contact area preferably has a spherical head-like or crowned shape, in particular with respect to a vertical section according to FIG. 6, having a contact surface that extends concentrically with respect to the rotational axis y, and thus, more preferably in the corresponding association position, concentrically with respect to the curvature of the cooking vessel rim 13 and/or of the lid edge 16 in a vertical section.

The cavity 20 is formed in the contact area 23 in such a way that in a lid release position according to FIG. 6, free vertical raising or lowering of the vessel 6 and of the lid 10 above the contact area 23 is achievable. Due to the overall circular disk-shaped configuration of the lid 10, the lid is associatable with the vessel rim in any orientation.

The rotational axis y of the locking part 17 extends through the center of the contact area 23 in order to keep the position of the vessel constant when the locking part 17 is rotated.

In the association position (see FIG. 6), the vessel rim 13 is supported on the crowned-spherically shaped surface of the contact area 23, the vessel 6 being held vertical by the locking part 17 in order to be able to compensate in a targeted manner on the underside of the vessel for any length tolerances between the vessel 6 and the vessel holder 5.

For operation of the kitchen appliance 1, the lid 10 is placed on top, with the lid edge 16 directly supported on the vessel rim 13, optionally indirectly with a seal in between.

As the result of rotating the locking part (via the electric motor 19, optionally manually), the over-engaging portions 21 which are spaced at a distance from one another in the axial direction are displaced over the lid edge 16 until an end position according to FIG. 5 is reached, in which the locked state of the lid 10 is achieved. In this regard, there is preferably no axial loading of the vessel 6 and the lid 10. Instead, this measure, preferably alone, ensures that the vessel 6 and the lid 10 in the locked state cannot be separated, even by large forces. The seal-tightness is ensured by the mentioned radial seal.

According to the first exemplary embodiment illustrated in FIGS. 1 to 9, it is further preferred that two locking parts 17 are provided which, with respect to a top view according to FIG. 4, are oppositely situated, with a parallel orientation of the rotational axes y with respect to one another. As a result of this arrangement, an overall four-point locking of the lid 10 is achieved due to the two over-engaging portions 21 provided for each locking part 17. As a result, the cooking vessel 6 is initially supported via the cooking vessel rim 13 on two contact areas 23 which oppose one another at an angle of 180°, so that, with respect to a top view, the lines v which connect the locking areas to one another intersect in the region of the vertical axis x of the vessel 6, in addition the point of intersection of the connecting lines v being situated vertically above the center of gravity of the vessel. As a result, the vessel 6 does not develop a supporting tilting torque which would have to be supported at some other location.

In particular due to the over-engaging portions 21, i.e., locking areas, provided at a distance from one another in the direction of extent of the rotational axis y, the flow of force is applied from the contact areas 23 of the locking parts 17 beneath the vessel rim 13, through the respective locking part 17, to the over-engaging portions 21 and thereby to the lid 10. In the illustrated exemplary embodiment, four contact pressure points are thus formed on the periphery of the lid 10. The vessel 6 and the locking parts 17 have the necessary rigidity for distributing the force, which advantageously results in a greater material selection for the lid 10.

The contact area 23 and the locking area, i.e., over-engaging portion 21, may be provided in a shared transverse plane with respect to the rotational axis y. However, such an approach, in particular in the region of the cavity portion 22 which results, has proven to be susceptible to soiling, the cavity portion 22 also being difficult to access for cleaning. Furthermore, in such an approach only one locking area would result for each locking part 17, which may prove to be disadvantageous in particular with regard to the sealing function, in particular in the event of deformation or buckling of the lid 10. Due to the proposed axial equalization of the locking (locking areas or over-engaging portions 21 at an axial distance from one another), the narrow, soiling-prone gap (cavity portion 22) between the contact area 23 and the over-engaging portion 21 is eliminated. The contact area 23 is freely accessible due to the corresponding formation of the cavity 20, which in particular simplifies cleaning of the locking part 17.

As is also apparent in particular from the sectional illustration in FIG. 5, the over-engaging portion 21 engages over the lid edge 16 and the vessel rim 13 with radial play, with respect to the rotational axis y, of preferably 0.5 to 2 mm, more preferably approximately 1 mm, thus ensuring that, for example due to tolerances with regard to the geometry of the locking areas of the locking parts 17 and/or due to tolerances with regard to the position of the locking parts 17 in or on the kitchen appliance 1, no inadvertent tilting torque is introduced into the vessel 6 in the course of locking when the play between the locking part 17 and the lid 10 is too small or even approaches zero. Within the scope of the play that is present, the lid 10 may move axially, with respect to the vertical axis x of the vessel 6, without impairing the seal-tightness ensured by the radial seal.

In addition, the configuration of the locking parts 17, more preferably of one locking part 17, also in particular with regard to the cavity 20 and the contact area 23, is selected in such a way that, according to the illustration in FIG. 10, the lid 10 may be placed upright, for example to add further recipe ingredients to the cooking vessel 6, the lid edge 16, which engages in the cavity portion 22, being radially inwardly supported, with respect to the vertical axis x, via the lid edge 16 at the facing edge surface of the vessel rim 13, or alternatively, being radially outwardly supported in the region of the collar 15 at the free end face of the over-engaging portion 21. In this lid position, any soiling (condensate, for example) adhering to the underside of the lid may run back into the cooking vessel 6 via the vessel rim 13.

Figure 11:
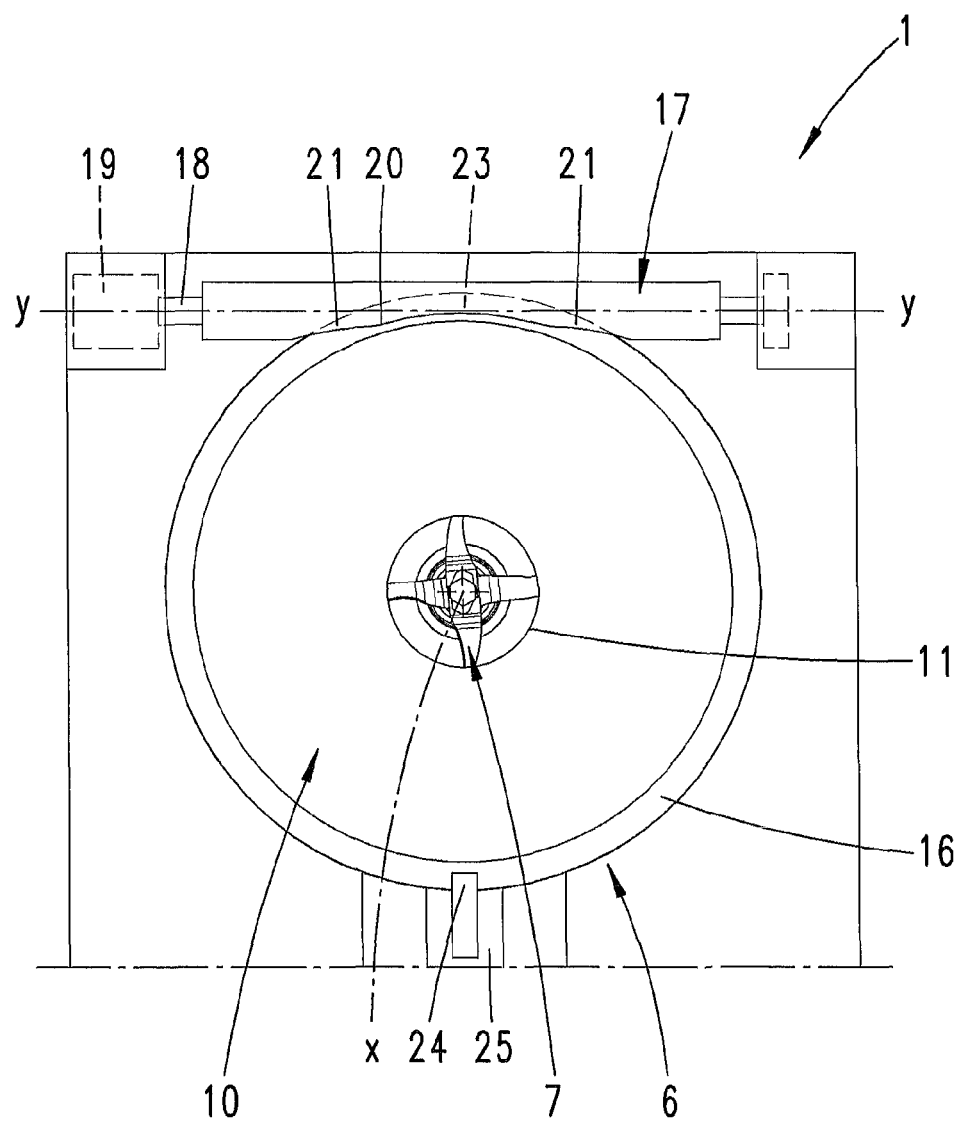
FIG. 11 shows a top view corresponding to FIG. 4 for a second embodiment.

FIG. 11 illustrates an alternative embodiment in which only one locking part 17 as described above is provided, the locking part being supported at the other end, opposite from the drive side on the kitchen appliance. With respect to a top view, a fixed over-engaging element 24 is provided, which is diametrically opposite the locking part 17. This element is, for example, formed on the kitchen appliance 1, more preferably in the vertical top end region of a handle 25 which is secured to the vessel 6. The element 24 is configured in such a way that it engages over the lid edge 16 in the mounted position of the lid 10 on the vessel rim 13, this over-engaging element 24 on its own not providing locking. Locking is not achieved until the oppositely situated locking part 17 is appropriately displaced by rotation. Three-point locking of the lid 10 is achievable as a result of this configuration.

Figure 12:
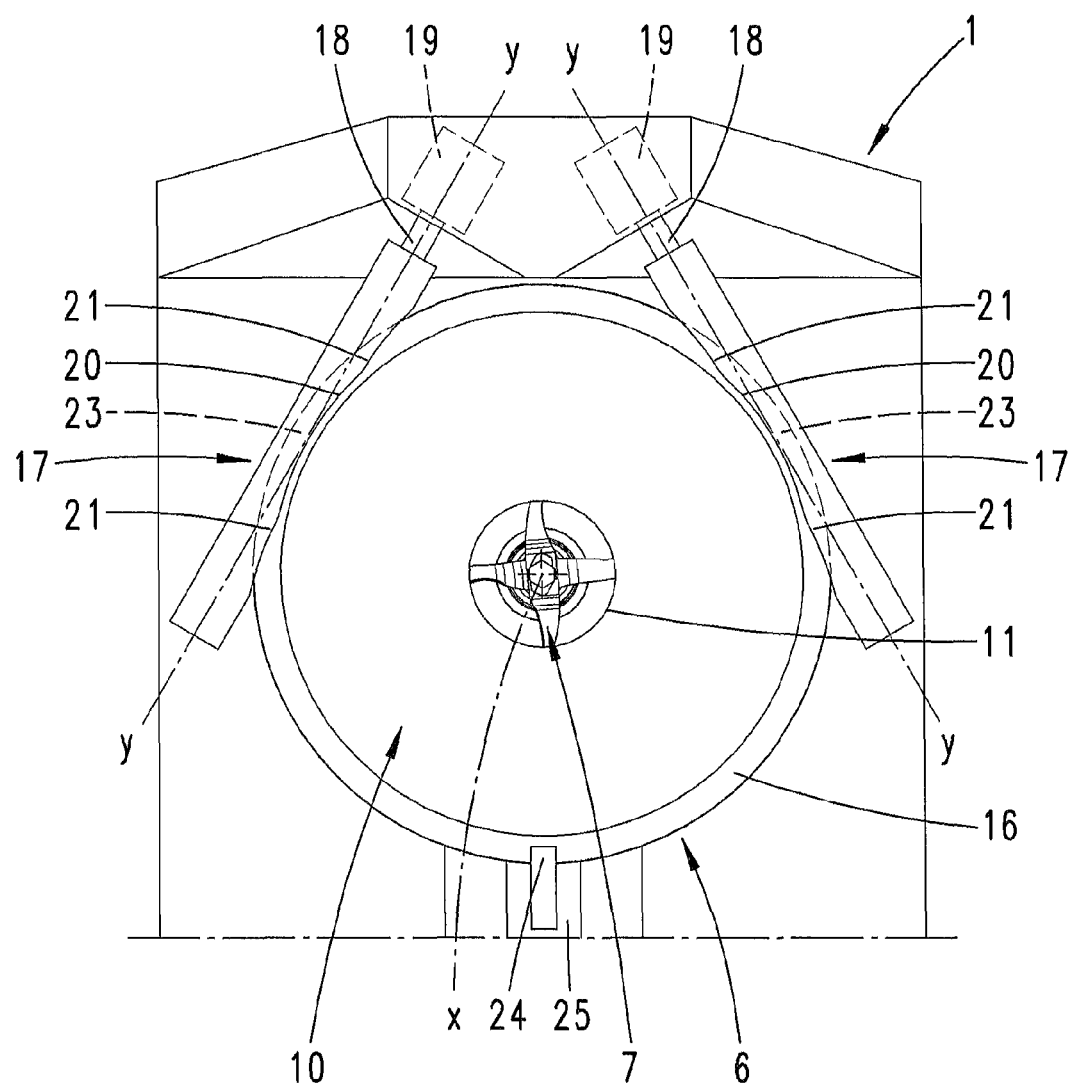
FIG. 12 shows another top view corresponding to FIG. 4 for a third embodiment.

In another alternative, according to the illustration in FIG. 12, two locking parts 17 are provided, whose rotational axes y define an acute angle of approximately 60° with reference to a top view, the rotational axes y extending in a common plane. A stationary over-engaging element 24 is formed diametrically opposite from the point of intersection of the two rotational axes y, accordingly resulting in an overall five-point locking.

The lid 10 is hooked underneath the over-engaging element 24 in the course of placing the lid on the vessel 6.

Mounting of the lid 10 in any orientation is made possible by the configuration of the lid 10, preferably having an overall circular disk shape, as well as the appropriately adapted configuration of the vessel 6 in the region of the vessel rim 13.

Actuating the locking part 17, i.e., rotationally displacing the locking part from a release position according to FIG. 7 into the locking position according to FIG. 5 and back, requires a small drive torque. This provides the option of automatic locking of the lid 10, in particular locking which may be carried out automatically upon starting the kitchen appliance 1, in particular upon starting the stirring unit 7 and/or the heater 8. The rotary end positions of the locking part 17 are preferably stop-limited. In addition, in particular the locking position of the locking part 17 is detectable, for example by using an appropriate sensor system, so that it is possible for the kitchen appliance 1 to be started only by an appropriately generated signal. In addition, the presence of the lid 10 is also detectable, so that it is correspondingly possible for the kitchen appliance 1 to be started only when the lid 10 is mounted and preferably locked. For example, for this purpose the lid 10 may provide a stop limitation of the rotary displacement of the locking part 17 into the locking position, whereby when the lid is absent, the locking part 17 is displaceable beyond a predefined detectable locking position, which indicates absence of the lid 10.

FIGS. 13 and 14 show another embodiment of a locking part 17. This locking part is formed and rotationally situated in such a way that its geometric axis y passes through the vessel wall 12, as is apparent in particular from the illustration in FIG. 14. This accordingly results in a wave-like axial portion of the locking part 17, at least in part, in particular on the engagement side, which is preferably associated with the stub shaft 18 and through which the geometric axis y preferably passes centrally. The locking part 17, the same as the locking part 17 in the embodiment according to FIG. 8, is provided with a cavity 20 which extends substantially in the longitudinal extent of the locking part 17, and which is configured in such a way that a circular arc-like over-engaging portion 21 results which in each case is associated with the end regions of the cavity 20, viewed in the axial direction, with respect to a vertical section, i.e., with respect to a section viewed perpendicular to the rotational axis y. This over-engaging portion also preferably extends concentrically with respect to the rotational axis y, the cavity portion 22 covered by the over-engaging portion 21 being adapted, with regard to its radial extent and also preferably with regard to its extent in the peripheral direction, for accommodating in a positive-fit manner the vessel rim 13 as well as the lid edge 16 of the lid 10 placed on the vessel 6. The over-engaging portion 21, which extends in a freely protruding manner with respect to a vertical section, extends in a circular arc-like manner, preferably over a range of approximately 80° to 85°.

Due to the alignment of the rotational axis y for passing through the vessel wall 12, at the locking part 17 preferably two offset contact areas 23 for the vessel rim 13 result over the periphery of the vessel rim 13, the contact areas 23 preferably being in a line, more preferably being elevated with respect to surrounding areas. This accordingly results in two contact areas, which are offset relative to one another viewed in the direction of extent of the axis y, for the vessel rim 13 for each locking part 17. In one preferred embodiment, these contact areas 23 are positioned in such a way that a cross-sectional plane, viewed transversely with respect to the axis y, at the same time intersects the region of an over-engaging portion 21.

It is further preferred that the geometric axis y is offset radially inwardly, with respect to a straight line which extends parallel thereto and at a tangent to the vessel wall 12 on the outside of the wall, by an extent that preferably corresponds at least to the material thickness of the vessel wall 12, more preferably a multiple of 0.25 to 1 of the free cross-sectional extent (starting from the associated exterior vessel wall) of the vessel rim 13 in the radially outward direction.

FIGS. 15 and 16 show an embodiment in which a locking part 17 according to the above description, in which the geometric axis y passes through the vessel wall 12, is curved with respect to the longitudinal extent of the locking part 17 for reducing in particular the diameter that results in the freely protruding end portion, with formation of correspondingly positioned over-engaging portions 21 and contact areas 23.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

LIST OF REFERENCE NUMERALS

1 Kitchen appliance
2 Control panel
3 Buttons
4 Display
5 Vessel holder
6 Vessel
7 Stirring unit
8 Heater
9 Power cord
10 Lid
11 Filling opening
12 Vessel wall
13 Vessel rim
14 Curved surface
15 Collar
16 Lid edge
17 Locking part
18 Stub shaft
19 Electric motor
20 Cavity
21 Over-engaging portion
22 Cavity portion
23 Contact area
24 Over-engaging element
25 Handle
26 Mounting
a Dimension
d Dimension
v Connecting line
x Vertical axis
y Rotational axis
E Plane

The invention claimed is:
1. A cooking vessel comprising:
a vessel body;
a lid; and
a locking mechanism; wherein
the vessel has a base, a wall, and a radially projecting rim, wherein the vessel wall merges into the radially projecting rim;
the lid has a lid edge which overlies the radially projecting rim;
wherein the locking mechanism comprises a locking part which removably secures the lid to the radially projecting rim;
the locking part (17) comprises an elongated member having a wave-like design comprising a cavity (20) that extends over the axial length of the locking part; an upper edge of the cavity further having an arc like engag- ing portion (21) and a spherically shaped projecting contact area (23) within the center of the cavity;

wherein the locking part rotates to secure the lid edge to the vessel projecting rim in a positive fit manner.

2. The cooking vessel according to claim 1, wherein the locking part rotates about a geometric axis (y), the geometric axis (y) runs in its extent parallel to a plane (E) that is determined by the lid edge (16) or at an acute angle of 0.5° to 30° with respect to said plane, the plane being transverse with respect to a vertically aligned vessel axis.

3. The cooking vessel according to claim 1, wherein a geometric axis (y) of the locking part is situated outside the vessel wall (12).

4. The cooking vessel according to claim 1, wherein a geometric axis (y) of the locking part passes through the vessel wall (12).

5. The cooking vessel according to claim 1, wherein a geometric axis (y) of the locking part extends beneath the vessel rim (13).

6. The cooking vessel according to claim 1, wherein the locking part (17) is rotatably drivable from an end portion from a release position into a locking position, and vice versa.

7. The cooking vessel according to claim 1, wherein in a locked state at least two over-engaging portions (21) at a distance from one another in a peripheral direction of the lid edge (16) are provided on the locking part (17).

8. The cooking vessel according to claim 7, wherein in the locked state outermost locking areas of a locking part (17) are separated from one another by a distance that is 1/10 to 1/2 of the lid diameter (d).

9. The cooking vessel according to claim 1, wherein the locking part (17) engages over the lid edge (16) in a circular arc-like manner in cross-section over a range of 30° to 90°.

10. The cooking vessel according to claim 1, wherein the locking part (17) would rotate between 30° to 90° between an open position and a closed position where it is secured to the vessel rim.

11. The cooking vessel according to claim 1, wherein a stationary over-engaging element (24) is formed opposite from the locking part (17).

12. The cooking vessel according to claim 1, wherein two locking parts (17) are oppositely situated with respect to a center axis (x) of the vessel (6).

13. The cooking vessel according to claim 1, wherein two oppositely situated locking parts (17) are provided, and rotational axes (y) of the locking parts (17) are enclosing an acute angle in a top view.

14. The cooking vessel according to claim 13, wherein a stationary over-engaging element (24) is formed diametrically opposite from a point of intersection of the two rotational axes (y).

15. The cooking vessel according to claim 1, wherein the contact area (23) is provided centrally, with respect to the longitudinal extent of the locking part (17), between the outermost locking areas.

16. The cooking vessel according to claim 1, wherein the locking part (17) has two contact areas (23) for the vessel rim (13) which are offset over the periphery of the vessel rim (13).

17. An electrically operated kitchen appliance having a vessel (6) according to claim 1 as a cooking vessel.

* * * * *